United States Patent [19]

Zürcher et al.

[11] Patent Number: 4,938,986
[45] Date of Patent: Jul. 3, 1990

[54] RECOVERING ROUGHAGE FROM DRAFF AND PRODUCT PRODUCED ACCORDING TO THE METHOD

[75] Inventors: Christian Zürcher, Eppertshausen; Rüdiger Gruss, Weiskirchen, both of Fed. Rep. of Germany

[73] Assignee: Binding-Brauerei AG, Frankfurt am Main, Fed. Rep. of Germany

[21] Appl. No.: 138,729

[22] Filed: Dec. 29, 1987

[30] Foreign Application Priority Data

Dec. 29, 1986 [DE] Fed. Rep. of Germany ....... 3644600

[51] Int. Cl.⁵ .......................... A23K 1/00; A23K 1/06
[52] U.S. Cl. .................................... 426/624; 426/481; 426/518; 426/807
[58] Field of Search ............... 426/615, 624, 481, 807, 426/518, 626

[56] References Cited

U.S. PATENT DOCUMENTS

| | | | |
|---|---|---|---|
| 87,397 | 3/1869 | Christie et al. | 426/624 |
| 821,326 | 5/1906 | Ahlers | 426/624 |
| 854,791 | 1/1907 | Ahlers | 426/624 |
| 2,158,043 | 5/1939 | Grelck | 426/624 |
| 2,214,909 | 9/1940 | Pittman et al. | 426/625 |
| 2,225,428 | 12/1940 | Christensen | 426/624 |
| 2,492,668 | 12/1949 | Stacom | 426/481 |
| 3,271,160 | 9/1966 | Kopas et al. | 426/481 |
| 3,821,416 | 6/1974 | Thompson et al. | 426/624 |
| 3,962,478 | 6/1976 | Hohlbein et al. | 426/624 |
| 4,552,775 | 11/1985 | Baeling | 426/624 |

FOREIGN PATENT DOCUMENTS

| | | |
|---|---|---|
| 50330 | 4/1982 | European Pat. Off. . |
| 327675 | 1/1918 | Fed. Rep. of Germany . |
| 2333387 | 5/1975 | Fed. Rep. of Germany . |
| 2403203 | 7/1975 | Fed. Rep. of Germany . |
| 2940859 | 4/1981 | Fed. Rep. of Germany . |
| 3039430 | 8/1982 | Fed. Rep. of Germany . |
| 3406127 | 8/1984 | Fed. Rep. of Germany . |
| 312433 | 5/1929 | United Kingdom . |
| 2135565 | 9/1984 | United Kingdom . |

OTHER PUBLICATIONS

H.-J. Niefind et al., *Brauwelt*, "Biertreber für die menschliche Ernährung," Nr. 11, pp. 428–432 (1982).
Von M. Loncin et al., *Brauwelt Jg*, "Gewinnung von Proteinkonzentrat aus Biertrebern" 117, No. 3, pp. 42–43, (Jan. 20, 1977).

*Primary Examiner*—R. B. Penland
*Attorney, Agent, or Firm*—Spencer & Frank

[57] ABSTRACT

An energy-efficient method of recovering roughage from brewery residues (draff), including adding water to the draff and mixing to form a mixture of a soft protein fraction and a hard roughage fraction, separating the soft protein fraction from the hard roughage fraction, and removing water from the separated roughage fraction. After separating water the roughage fraction may be dried, and comminuted. In contrast to other methods, the separation into roughage and protein fractions is performed before the drying step and only the roughage fraction of interest is dried.

11 Claims, 2 Drawing Sheets

RECOVERING ROUGHAGE FROM DRAFF AND PRODUCT PRODUCED ACCORDING TO THE METHOD

FIELD OF THE INVENTION

The present invention relates to a method of recovering roughage from draff and to a product produced according to the method and suitable for use as a foodstuff.

TECHNOLOGY REVIEW

German Patent No. 327,675 discloses the use of draff in such a manner that it is suitable for human consumption. In the process employed there, the fat fractions are initially removed from the dried draff by solvent extraction and then the proteins in the fat-free substance are dissolved with the aid of soda and are pressed off. The proteins are then hydrolized with acids. The hydrolized product is neutralized and evaporated into a concentrate which can be used as seasoning. The shell residue is roasted to then provide a caramel-like mass suitable for the preparation of brewed beverages.

According to the process disclosed in German Patent No. 3,039,430, different size particles are initially produced from wet draff and these are separated by screening, with the wet draff then being subjected to sudden drying in a stream of hot air and being comminuted into coarse shell pieces and fine protein particles which are then separated.

The product disclosed in German Patent No. 2,940,859 includes dry yeast and cereal malt residues which originate from a brewing process and are ground into meal, with cottage cheese, yoghurt or milk being added.

SUMMARY OF THE INVENTION

The invention provides a method of producing, in a simple manner, a product which is suitable for use as a raw material for foodstuffs and which, compared to customary products of this type, contains about 30% more raw fiber and about 10% more roughage (a coarse bulky food relatively high in fiber and low in digestible nutrients), with its fat, or more precisely, lipid contents being less than 5% of its total weight.

The product according to the present invention, moreover, is a pure draff product without other additives. In contrast to German Patent No. 327,675, the described method of obtaining it does not require chemical additives. A weak acid is employed only for the removal of heavy metals in order to realize a very high stability in storage, and this acid is removed again from the product by washing it during the processing phase. Moreover, compared to the process disclosed in German Patent No. 3,039,430, the process is simplified considerably and is much more favorable with respect to energy costs. The product of the present invention has a raw fiber content which is about 30% higher than in a prior products of this type and also contains about 10% more roughage. The fat or, more precisely, the lipid content of the product of the present invention is less than 5% of the total weight of the final product, thus considerably improving storability compared to prior products of this type.

DETAILED DESCRIPTION OF THE INVENTION

Figure 1:
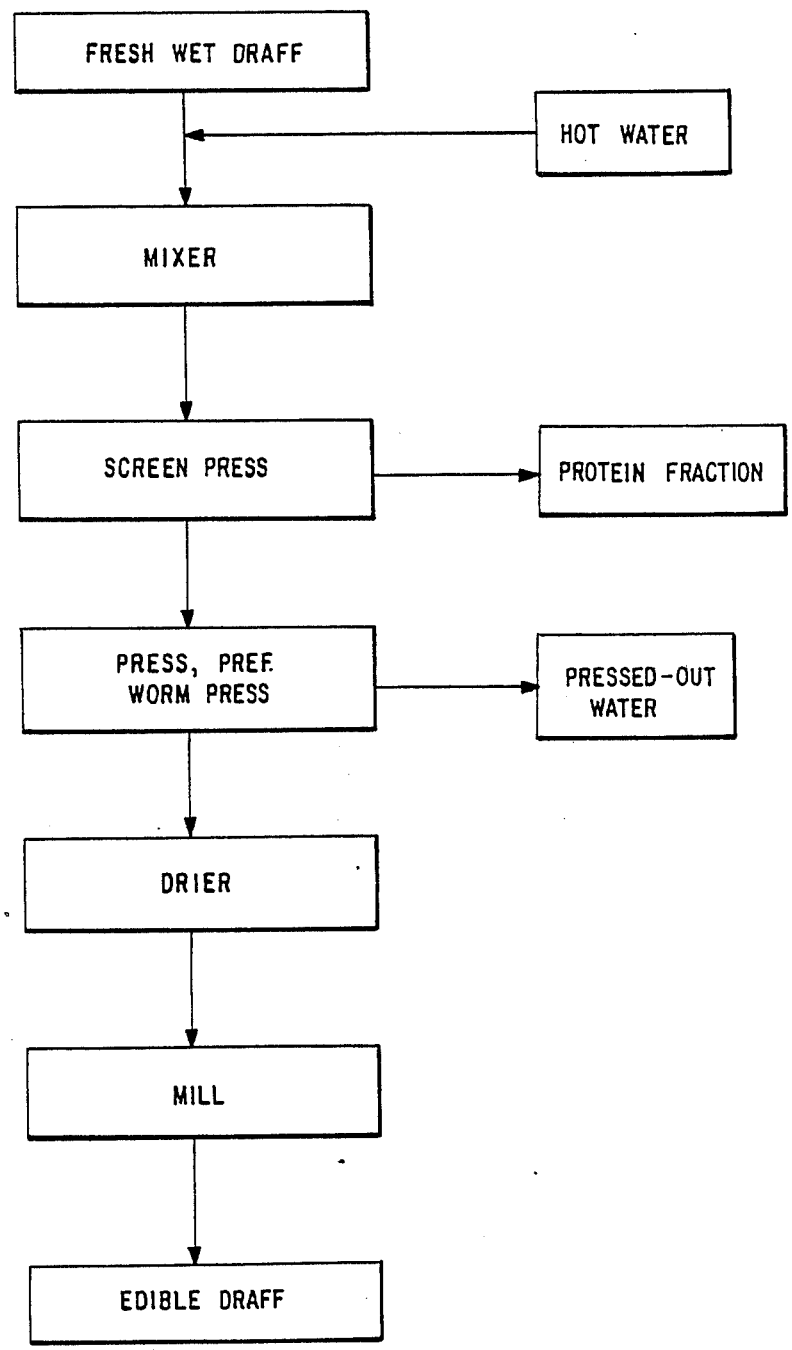
FIG. 1 shows a process according to the invention.
Figure 2:
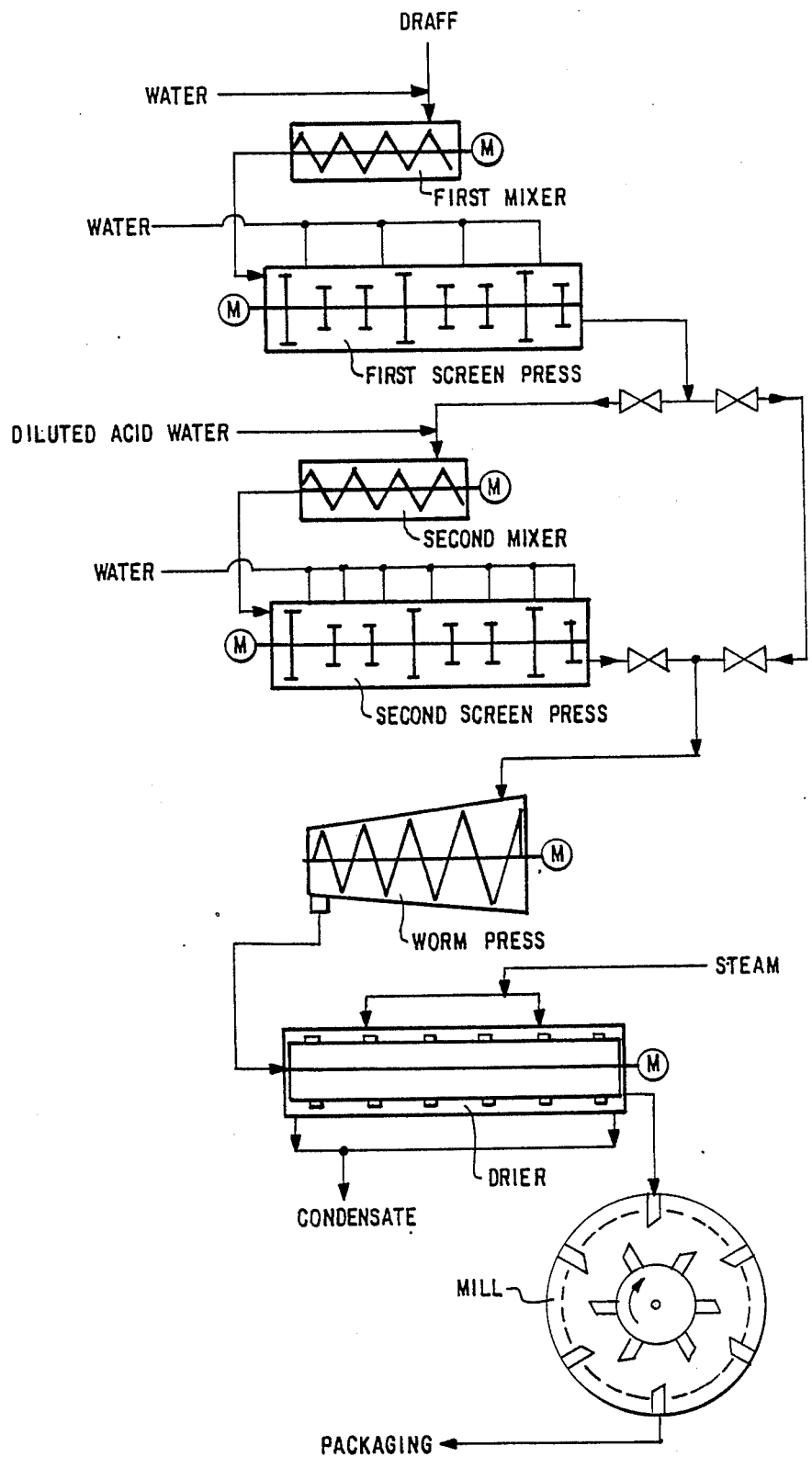
FIG. 2 shows an alternative method according to the invention.

The method according to the invention involves the following steps. Water, preferably at a temperature above about 70° C., is added to the brewery residues, called draff, e.g. malt draff, preferably at a ratio of about 1:1, by weight, with this ratio depending on the desired degree of protein or fat separation. The resulting mixture is introduced into a mixer and mixed vigorously to enhance separation of the soft protein fraction from the hard roughage fraction.

The protein fraction is then partially separated from the roughage fraction by introduction of the mixture into a screen press or a decanter, preferably equipped with screening discs having holes no larger than about 3 mm.

A low-protein roughage fraction is obtained and then pressed out in a press, preferably worm press, and the pressed-out water is extracted. The almost dry roughage fraction is dried to the desired dryness in any desired drier and is comminuted in a mill to a predetermined grain size.

In a further embodiment of the method, the above-described low-protein roughage fraction, after passing through the screen press or the decanter, is again mixed with hot water, or hot diluted acid, preferably an organic acid, such as lactic acid from potable milk in a concentration of 0.3 to 3%, and is then again mixed in any desired mixer. The temperature of the water or diluted acid may range from about 20° C. to about 100° C., preferably from about 30° C. to about 90° C. Thereafter, protein, fat and heavy metals are removed from the raw product in a screen press or decanter preferably equipped with screening discs having holes no larger than about 3 mm. During the screen pressing or decanting process, the acid is washed out by spraying the product with water. The resulting roughage fraction is then dewatered as much as possible in a press, preferably a worm press. In a drier of any desired type, the remaining water is then removed in the form of water vapor. The resulting finished product is then comminuted in a mill to a predetermined grain size.

The method of the present invention operates in an energy saving manner. In contrast to other methods, the separation into roughage and protein fractions is performed before the drying step and only the roughage fraction of interest is dried. The protein fraction can be condensed, for example, by simple decanting and can be mixed into the fresh draff not subjected to the process in order to increase its feed value.

The present disclosure relates to the subject matter disclosed in application No. P 36 44 600.9 filed in the Patent Office of the Federal Republic of Germany on Dec. 29, 1986, the entire specification of which is incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of recovering roughage from draff, comprising:
   (a) adding water to draff in a weight ratio of about 1:1, said draff comprising a soft protein fraction and a hard roughage fraction which are partially separated from each other;
   (b) mixing said draff and water to enhance the separation of said soft protein fraction from said hard roughage fraction;
   (c) mechanically separating said soft protein fraction from said hard roughage fraction by using at least one of a screen press or a decanter;
   (d) removing water from said separated roughage fraction, and
   (e) drying said separated roughage fraction.

2. The method of recovering roughage from draff set forth in claim 1, including comminuting said dried roughage fraction.

3. A method of recovering roughage from draff, comprising:
   (a) adding water to draff in a weight ratio of about 1:1;
   (b) mixing said draff and water to form a mixture of a soft protein fraction and a hard roughage fraction;
   (c) separating said soft protein fraction from said hard roughage fraction;
   (d) mixing said separated roughage fraction with a hot liquid selected from the group consisting of hot water and hot diluted acid to remove protein, fat, and heavy metals from said separated roughage fraction; and
   (e) removing water from said separated roughage fraction.

4. The method of recovering roughage set forth in claim 3, wherein said hot liquid is a hot diluted acid.

5. The method of recovering roughage set forth in claim 4, including, after removing protein, fat, and heavy metals, washing said separated roughage fraction to remove said diluted acid, and thereafter removing water from said separated roughage fraction.

6. The method of recovering roughage set forth in claim 5, including drying said separated roughage fraction after removing water therefrom.

7. The method of recovering roughage set forth in claim 6, including comminuting said dried roughage fraction.

8. The method of recovering roughage set forth in claim 3, wherein said hot liquid is a hot, diluted organic acid.

9. The method of recovering roughage set forth in claim 8, wherein said organic acid is lactic acid.

10. The method of recovering roughage set forth in claim 9, including, after removing protein, fat, and heavy metals, washing said separated roughage fraction to remove said lactic acid, and thereafter removing water from said separated roughage fraction.

11. The method of recovering roughage set forth in claim 10, including comminuting said dried roughage fraction.

* * * * *